UNITED STATES PATENT OFFICE.

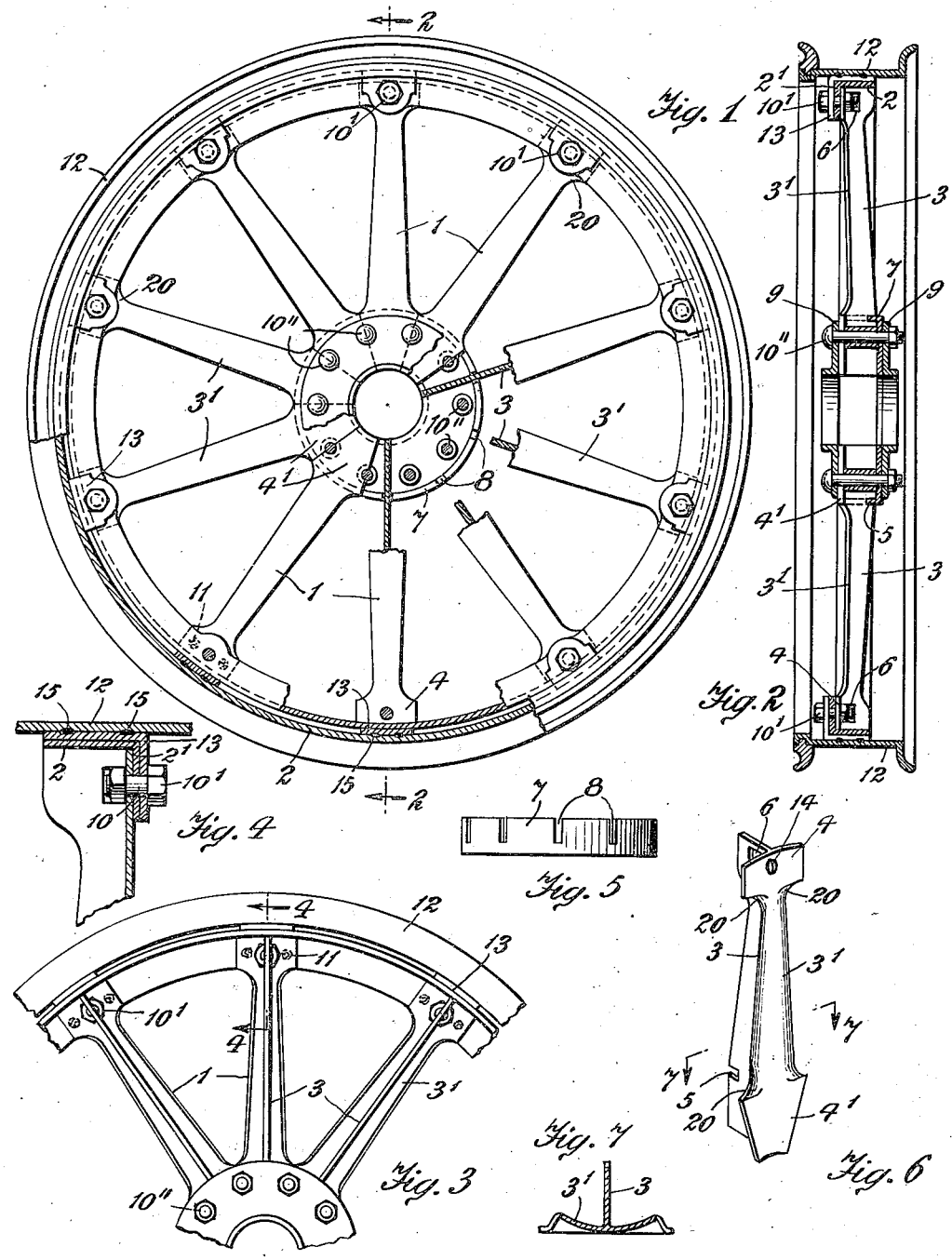

MAURICE LACHMAN AND LAURENCE S. LACHMAN, OF NEW YORK, N. Y., ASSIGNORS TO BETHLEHEM STEEL COMPANY, OF BETHLEHEM, PENNSYLVANIA, A CORPORATION OF PENNSYLVANIA.

METAL WHEEL.

1,398,558.  Specification of Letters Patent.  Patented Nov. 29, 1921.

Application filed February 26, 1921. Serial No. 447,967.

*To all whom it may concern:*

Be it known that we, MAURICE LACHMAN and LAURENCE S. LACHMAN, citizens of the United States, and residents of New York, in the county of New York and State of New York, have invented certain new and useful Improvements in Metal Wheels, of which the following is a specification.

Our invention relates to metal wheels of the class in which the spokes are of metal and are suitably secured to or anchored in the hub structure and rim at their opposite ends respectively.

The principal object of the invention is to utilize metal bars T-shaped in cross-section for the spokes and to produce a wheel therefrom which shall be strong and firm in respect to the union of the spokes with the rim and with the hub, which may be readily and cheaply constructed, which shall effectively resist torsional and sidewise strains and which may have the appearance of a wheel like the wooden or artillery wheel with the sides of the spokes presenting a rounded surface.

To these ends the invention consists in the form of the spoke, the manner of attaching or connecting the same to the hub structure and to the rim and the means for securing thereto a detachable tire carrying outer rim, all as more particularly hereinafter described and then specified in the claims.

In the accompanying drawings:

Figure 1 is a side elevation of a wheel embodying our invention, a part of the hub and rim structure being broken away.

Fig. 2 is a vertical cross-section on the line 2—2 Fig. 1.

Fig. 3 is an elevation of a portion of the wheel looking from the reverse side of Fig. 1.

Fig. 4 is an enlarged vertical section through the rim and end of the spoke.

Fig. 5 shows in plan the portion of the hub termed herein the hub barrel.

Fig. 6 is a perspective view of a T-bar suitably formed for use in my invention.

Fig. 7 is a cross-section on the line 7—7 Fig. 6.

1 indicates the spokes and 2 the metal rim to which they are fastened or anchored by bolting, riveting or welding, or in any other suitable way. Each spoke consists of a metal bar T-shaped in cross-section, arranged in the completed wheel with the stem of the T or web 3 of the bar occupying a plane transverse to the plane of the wheel and with the head 3′ or flange of the bar presented to the side of the wheel to form the spoke side. In making up the spoke suitable lengths of plain T-shaped bar metal are taken and to best serve the purposes of our invention each is modified in form, as indicated in Figs. 6 and 7, by suitable operations, so as to have the head of the bar 3′ rounded between the extremities 4 4′ of the spoke where it is secured to the rim and hub respectively, thus giving the effect of a rounded spoke when seen from the side of the wheel. Preferably the head 3′ in its rounded part is also tapered radially outward, but as will be seen the portions 4, 4′ of said head are retained flat for engagement thereof with the flat surfaces in the rim and hub structure to which they are secured. Also, as will be seen, the rounding of the portion of the head 3′ of the T does not terminate abruptly in the flat portions 4, 4′ but is gradually merged therein at the angle between them, the curve being both transverse to the plane of the head and in the plane thereof, whereby the tendency to collection of mud or dirt at the junction of the spoke with the rim and hub is largely obviated. At 5 is indicated a slot in the web or stem of the T by which it is interlocked with the hub barrel to resist radial movement as will be presently seen, while at the outer end of the T-shaped bar the web or stem is provided with an opening 6 to receive the head of the fastening bolt by which the detachable rim is secured, as will also more fully hereafter appear. The sides of the head 3′ of the T spoke as well as the outer edge of the web 3 taper from the hub toward the rim whereby the desired resiliency of the wheel may be attained while at the same time, owing to the T cross-section, the strength is maintained.

7 indicates a metal hub barrel provided with notches 8 entering the barrel from one edge and also preferably a circumferential, inwardly extending flange, as shown in Fig. 2, whereby the same may be suitably clamped in position between the end plates 9 by means of suitable bolts 10″, spacing bushings on said bolts being interposed between said flange 9 and the inner side of the heads 4′ of the spokes. Said bolts may be applied on the dividing line between the ends 4' of contiguous spokes where the portion of T-head is given a taper as shown in Fig. 6, so that on assembly of the spokes the edges of the heads will form a continuous plane and be thus firmly interlocked.

In the finished wheel the flat outer faces of the ends 4 of the spokes comprising the flat T-head seat against the flat inner face of the inwardly projecting circumferential flange 2' of the rim 2 and are fastened thereto in any desired way, as for instance, by the spot welds indicated at 11, Fig. 3, or by the bolts 10 which, in the form of the invention shown, serve also as the means for securing a detachable rim 12 in place upon the rim 2. Said detachable rim is furnished with lugs 13 which extend down over the flange 2' and are engaged by the nuts or heads 10' on the outer end of the bolts 10. At their inner ends said bolts are provided with nuts of hexagonal or other suitable shape which are entered sidewise in the opening 6 of the stem 3 of the T bar, the bolt itself passing through a hole indicated in dotted lines at 14, Fig. 6, extending through the flat portion 4 of the head of said bar and into the opening 6 in which the nut or head at the inner end of the bolt is received. The latter nut is prevented from turning by the engagement of its angular faces with the edges of said opening. The lugs 13 may be spot welded to the rim 12 as indicated at 15 so as to be practically integral therewith.

When the parts are assembled and secured together it will be seen that the flat face 4' of each spoke engages the flat face of the hub end plate and is anchored against the same by the fastening devices, while the torsion effects due to traction are resisted by engagement of the web or stem of each T-shaped bar back of or in line with the slots in said web against the edges of the slot in the shell, while owing to the fact that the slots in the shell stop short of the opposite edge of the shell, the part of said shell in line or back of the slot therein provides a part which, being engaged with both edges of the slot in the web or stem of the T, holds the spoke against radial movement inward or outward.

As will be obvious, by the construction described, great rigidity and strength are secured both in the hub and rim parts where the spokes are joined to them, while moreover the construction is such that simple methods of machining or other ways of producing the component parts may be employed. Also the wheel, when viewed from the side of the vehicle to which the face 3' of the head of the T-bar is presented as the spoke side, will have a pleasing appearance and will resemble largely the ordinary wooden wheel having a round spoke or spoke with a rounded side.

What we claim as our invention is:

1. In a metal wheel, a spoke consisting of a bar T-shaped in cross-section and having the outer edges of the head and web tapered from the hub part toward the rim part of the spoke as and for the purpose described.

2. In a metal wheel, a spoke consisting of a bar T-shaped in cross-section and having the head of the T rounded or curved and presented as the side of the spoke in the wheel structure.

3. In a metal wheel, a spoke consisting of a metal bar T-shaped in cross-section, the head of the T at the ends of said bar being flat for securing to the rim and hub respectively and the intermediate portion being curved or rounded transversely as and for the purpose described.

4. In a metal wheel, a spoke consisting of a metal bar T-shaped in cross-section, the head of the T at the ends of said bar being flat for securing to the rim and hub respectively and the intermediate portion being curved or rounded transversely, the curved portion of said head being gradually merged transversely and laterally in the flat portion retained on the ends of the bar where it is secured to the hub and rim.

5. In a metal wheel, metal spokes consisting of lengths of metal bar T-shaped in cross-section, the head of the T being retained flat at the extremities of the section of bar forming the spoke while the intermediate part of the head is narrowed to form the outer or side surface of the spoke proper.

6. In a metal wheel, metal spokes consisting of lengths of metal bar T-shaped in cross-section, the head of the T being retained flat at the extremities of the section of bar forming the spoke while the intermediate part of the head is narrowed and rounded transversely to the axis of the spoke to form the outer or side surface of the spoke proper.

7. In a metal wheel, the combination of spokes consisting of metal bars T-shaped in cross-section and a rim having a circumferential, inwardly extending flange against the flat inner face of which the flat outer face of the head of the T engages and means for securing them together.

8. In a metal wheel, the combination with metal spokes consisting of metal bars T-shaped in cross-section and having slots at their hub ends extending inwardly from the edge of the stem, a slotted hub shell with which the spokes interlock in the line of slotting of both said parts against both radial and circumferential movement and means for securing the hub ends of the spokes and the shell together in interlocking position.

9. In a metal wheel, the combination of a flanged rim having a flat flange face, a metal spoke consisting of a metal bar T-shaped in cross-section and having the head of the T flat at the outer and inner ends of the spoke while the intermediate portion is rounded, means for fastening the flat outer end against the flat surface of the rim flange and means for fastening the flat inner end of the T head against a flat surface of a component part of the hub structure.

Signed at New York, in the county of New York and State of New York this 25 day of February, A. D. 1821.

MAURICE LACHMAN.
LAURENCE S. LACHMAN.

Witnesses:
F. B. TOWNSEND,
IRENE LEFKOWITZ.